United States Patent
Isherwood et al.

(10) Patent No.: US 9,483,719 B2
(45) Date of Patent: Nov. 1, 2016

(54) SECURITY SUBSTRATE COMPRISING A MAGNETIC LAYER AND OPAQUE AND NON-OPAQUE REGIONS

(75) Inventors: Roland Isherwood, Whitchurch (GB); James Snelling, Andover (GB); Alan Brown, Hampshire (GB)

(73) Assignee: De La Rue International Limited, Basingstoke (GB)

(*) Notice: Subject to any disclaimer, the term of this patent is extended or adjusted under 35 U.S.C. 154(b) by 571 days.

(21) Appl. No.: 12/222,839

(22) Filed: Aug. 18, 2008

(65) Prior Publication Data

US 2008/0311317 A1 Dec. 18, 2008

Related U.S. Application Data

(63) Continuation of application No. 10/512,055, filed as application No. PCT/GB03/01768 on Apr. 24, 2003, now abandoned.

(30) Foreign Application Priority Data

Apr. 25, 2002 (GB) .................................. 0209564.4

(51) Int. Cl.
*B32B 3/00* (2006.01)
*G06K 19/06* (2006.01)
*D21H 21/42* (2006.01)
*B42D 25/355* (2014.01)
(Continued)

(52) U.S. Cl.
CPC ......... *G06K 19/06196* (2013.01); *B42D 25/00* (2014.10); *B42D 25/355* (2014.10); *D21H 21/42* (2013.01); *B42D 2033/04* (2013.01); *B42D 2033/16* (2013.01); *D21H 21/48* (2013.01); *Y10T 428/24628* (2015.01); *Y10T 428/24802* (2015.01); *Y10T 428/24868* (2015.01); *Y10T 428/24876* (2015.01)

(58) Field of Classification Search
USPC .................. 428/195.1, 403; 283/111, 93, 72; 235/494
See application file for complete search history.

(56) References Cited

U.S. PATENT DOCUMENTS 5,310,222 A * 5/1994 Chatwin et al. ................ 283/86
5,354,099 A * 10/1994 Kaule et al. .................... 283/85
5,697,649 A * 12/1997 Dames et al. .................. 283/83
(Continued)

FOREIGN PATENT DOCUMENTS

EP 319157 6/1989
FR 2771111 5/1999
(Continued)

OTHER PUBLICATIONS

Research Disclosure No. 323054, dated Mar. 1991.
(Continued)

*Primary Examiner* — Tamra L Dicus
(74) *Attorney, Agent, or Firm* — Dykema Gossett PLLC

(57) ABSTRACT

The invention relates to improvements in substrates and in particular to new substrates having magnetic and visual security features, which provide security against imitation. A security substrate comprising a transparent polymer carrier layer bearing indicia formed from a plurality of opaque and non-opaque regions and a transparent magnetic layer supported by the carrier layer containing a distribution of particles of a hard magnetic material of a size and distributed in a concentration at which the magnetic layer remains transparent.

3 Claims, 8 Drawing Sheets

(51) Int. Cl.
*B42D 25/00* (2014.01)
*D21H 21/48* (2006.01)

(56) References Cited

U.S. PATENT DOCUMENTS

| | | | |
|---|---|---|---|
| 5,766,738 A * | 6/1998 | Phillips et al. | 428/200 |
| 5,988,500 A * | 11/1999 | Litman | 235/450 |
| 5,997,849 A * | 12/1999 | Small et al. | 424/61 |
| 6,036,232 A * | 3/2000 | Kaule et al. | 283/85 |
| 6,255,948 B1 | 7/2001 | Wolpert et al. | |
| 6,294,241 B1 * | 9/2001 | Kaule et al. | 428/138 |
| 6,474,695 B1 * | 11/2002 | Schneider et al. | 283/72 |
| 6,549,131 B1 | 4/2003 | Cote et al. | |
| 6,659,507 B2 * | 12/2003 | Banahan | 283/81 |
| 6,726,813 B2 * | 4/2004 | Kaule et al. | 204/192.22 |
| 6,808,806 B2 * | 10/2004 | Phillips et al. | 428/403 |
| 6,930,606 B2 * | 8/2005 | Crane et al. | 340/572.1 |

FOREIGN PATENT DOCUMENTS

| | | |
|---|---|---|
| WO | 9604143 | 2/1996 |
| WO | 9928852 | 6/1999 |

OTHER PUBLICATIONS

English Abstract of FR2771111.

* cited by examiner

SECURITY SUBSTRATE COMPRISING A MAGNETIC LAYER AND OPAQUE AND NON-OPAQUE REGIONS

CROSS-REFERENCE TO RELATED APPLICATIONS

This application is a continuation of application Ser. No. 10/512,055, filed Nov. 10, 2004, now abandoned, which was a U.S. national phase filing of PCT/GB03/01768, filed Apr. 24, 2003, which claimed priority of Great Britain Application No. 0209564.4, filed Apr. 25, 2002. All priorities are claimed.

BACKGROUND OF THE INVENTION

1 Field of the Invention

The invention relates to improvements in substrates and in particular to new substrates having magnetic and visual security features, which provide security against imitation.

2 The Prior Art

It is widely known to use in banknotes and other security documents security elements, such as security threads or strips. These threads are partially or wholly embedded in a paper or plastic substrate, and generally provide different viewing conditions depending on whether the security document is viewed in transmitted or reflected light.

EP-A-319157, for example, describes a security element made from a transparent plastic film provided with a continuous reflective metal layer, such as aluminium, which has been vacuumed deposited on the film. The metal layer is partially demetallised to provide clear demetallised regions which form indicia. When wholly embedded within a paper substrate the security element is barely visible in reflected light. However, when viewed in transmitted light the indicia can be clearly seen highlighted against the dark background of the metallised area of the thread and adjacent areas of the paper. Such threads can also be used in a security document provided with repeating windows in at least one surface of the paper substrate at which the security thread is exposed. A security document of this type, when viewed in transmitted light, will be seen as a dark line with the indicia highlighted. When viewed in reflected light on the windowed side, the bright shiny aluminium portions are readily visible in the windows. This thread has been highly successful within the market place and is supplied under the trade mark Cleartext®.

For a number of years banknote issuing authorities have had an interest in combining both the public recognition properties of Cleartext® with the covert properties of a machine readable feature. To this end it is preferable to utilise machine readable features that can be read using detectors already available to the banknote issuing authorities. Examples of such machine readable devices are described in WO-A-92/11142 and EP-A-773872.

The security device of WO-A-92/11142 is an attempt to provide this combination. A security device conforming to this specification has been used commercially with some success. A central region of the security device has a metallic appearance with clear regions forming characters; on either side of this central strip in the width direction, there are layers of magnetic material with obscuring coatings to provide the necessary magnetic component. This is, however, a generally unsatisfactory means of achieving the combination of the appearance of Cleartext® with the required magnetic properties. The magnetic properties are satisfactory, but the requirement to place the magnetic layers on either side of a central region means that the latter must be relatively narrow with respect to the overall thread width and results in characters which are small, typically 0.7 mm high, and therefore not easily legible. Additionally, the structures of the devices described in WO-A-92/11142 are very complex and present substantial lateral registration problems in depositing the various layers; a misregistration of even 0.1 mm or so can allow the presence of the dark magnetic oxide to be apparent to the naked eye, thus revealing its presence and seriously detracting from the aesthetic appearance of the security thread.

A more satisfactory solution, from the processibility, ease of character recognition and aesthetics points of view, would be to manufacture a device of the kind described in EP-A-0319157 from a metal which is itself magnetic such that the size of the characters and ratio of character height: thread width of the Cleartext® product is maintained, whilst providing direct compatibility with existing magnetic thread detectors. One means of achieving this is disclosed in Research Disclosure No. 323054 of March 1991. In this Research Disclosure, a magnetic material is deposited onto a flexible substrate by vacuum sputtering or other known techniques; the non-metallised regions are created by selective printing of a resist layer and subsequent chemical etching. The disclosed magnetic materials may be nickel, cobalt, iron or alloys thereof with a preferred combination of cobalt:nickel in the ratio 85:15%. The disadvantage of this method is that vacuum deposition of cobalt: nickel to the necessary thickness is a relatively slow process and somewhat wasteful of cobalt, an expensive material. Furthermore, subsequent to this vacuum deposition process, further significant processing is required to etch the characters. The resultant product is therefore relatively expensive.

A further alternative approach is described in EP-A-773872 wherein a magnetic metal is deposited on a film of polymeric substrate as the substrate passes through a solution containing the magnetic metal, and a preparatory operation is carried out on a surface of the substrate prior to immersion of the substrate in the solution. The preparatory operation ensures that magnetic metal is deposited on the substrate in a chosen pattern such that when the security product is produced from the film by cutting the film, the magnetic metal on the security thread has a specific pattern and provides both a visual discernible security feature and a magnetically detectable security feature. This method produces a security thread with satisfactory visual and machine readable characteristics but the manufacture is not straight forward and is costly.

One further approach is detailed in WO-A-9928852. Here the security device includes a carrier substrate, a metallic layer disposed on the carrier substrate, and a magnetic layer disposed on the metallic layer in substantial registration with at least a portion of the metallic layer, thereby providing both metallic security features and magnetic security features. The metallic layer and the magnetic layer also form graphic or visually identifiable indicia on the carrier substrate to provide a visual security feature. According to one method, the metallic layer is applied to the carrier substrate, the magnetic layer is applied to the metallic layer, and the layers are etched to form the graphic indicia. The magnetic layer can, in one embodiment, include a magnetic chemical resist that is printed on the metallic layer in the form of the graphic indicia. This method again produces a security device with acceptable visual and magnetic characteristics but again has a high cost with regard to processing and production.

The present invention therefore seeks to provide a security substrate that may be slit into security threads for partially or wholly embedding into paper or polymer which has acceptable magnetic and visual characteristics as described above and also greatly simplifies the manufacturing process. Such a simplification produces costs savings for both manufacture and materials as levels of spoil are greatly reduced.

A security substrate comprising a transparent polymer carrier layer bearing indicia formed from a plurality of opaque and non-opaque regions and a transparent magnetic layer supported by the carrier layer containing a distribution of particles of a hard magnetic material of a size and distributed in a concentration at which the magnetic layer remains transparent.

A preferred embodiment of the present invention will now be described by way of example only, with reference to the accompanying drawings.

DETAILED DESCRIPTION OF THE PREFERRED EMBODIMENTS

The present invention makes use of transparent magnetic materials that are now available from a number of suppliers. Examples of such materials are described in U.S. Pat. No. 6,296,996, EP-A-660311, U.S. Pat. No. 5,520,954, EP-A-994386 and U.S. Pat. No. 6,258,519 and references therein. Such materials were originally developed for use within the photographic industry to allow information relating to a visual image to be stored magnetically on the photographic film. In the most basic form such transparent magnetic media comprises a polymeric film in which have been suspended magnetic particles of a hard magnetic material. The particles themselves are not colourless, but the degree of concentration is such as to allow the polymeric film to remain transparent. The film has a colour tint, which strengthens if the concentration of particles is increased. Various other forms of transparent magnetic media are described in the cited prior art any of which would be suitable for the present application. It has been found that low concentrations of these hard magnetic materials within such films is able to allow detection using existing banknote detection equipment. In particular, the wider the thread, the lower the concentration of magnetic particles is required for accurate machine detection, due to the fact that the signal recovery is considerably differentiated from the normal cash processing system noise.

Figure 1:
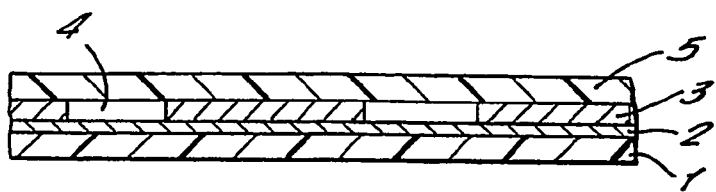
FIGS. 1, 2, and 3 are cross-sectional side elevations of a substrate according to the present invention.
Figure 4:
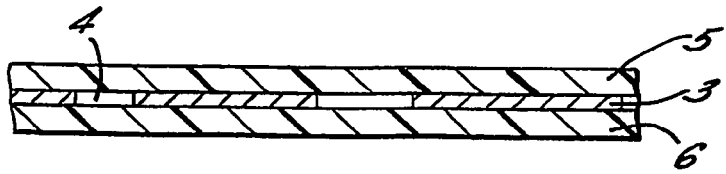
FIG. 4 is cross-sectional side elevation of an alternative substrate to that shown in FIG. 1.

FIGS. 1 and 4 illustrate two embodiments of a substrate according to the present invention. In FIG. 1 the substrate comprises a transparent polymer carrier layer (1), and a tinted, but transparent, magnetic layer (2) formed from novel acicular magnetic particles of iron oxide, approximately 200 nm in short length and 300-700 nm in long length, which are suspended in a varnish which is printed or coated onto the carrier layer (1). The size and distribution of the particles is controlled so that the thickness of the magnetic layer (2) is irrelevant. The size of the particles may vary from those given above for different materials, examples of which are listed below.

The invention requires the use of hard magnetic materials, namely those which have a magnetic remenence in the absence of an applied magnetic field, and preferably a coercivity of greater than 100 oersteds.

The hard magnetic particles may be black iron oxide, gamma iron oxide, cobalt treated gamma iron oxide, barium or strontium ferrites, metallic iron, metallic nickel, metallic cobalt, samarium cobalt, neodymium iron boron or aluminum nickel cobalt. Suitable magnetic materials are commercially available from Magnox Inc., Pfizer Pigments Inc or Toda Kogyo Corp., and suitable varnishes include 1462 from Luminescence, VHL 31534 from Sun Chemicals or 31833XSN, 20784XSN and 90838XSN, all from Coates Lorilleux. The carrier layer (1) may be PET, BOPP or another suitable polymer.

A surprising benefit lies in the provision of a distinctive colour or reflection by varying the coat weights of the magnetic material, whilst maintaining the transparency of the magnetic layer (2). This surprising effect can be enhanced or reduced dependent upon material type and coating thickness to suit the application.

Alternatively, as shown in FIG. 4, the magnetic particles may be incorporated in the polymer layer (6) itself. From herein it should be appreciated that the use of a coated polymer layer (1) or a polymer layer (6) containing the magnetic particles are interchangeable within all the described embodiments.

The substrate is provided with indicia formed from a plurality of opaque and non-opaque regions, which may be metallised, demetallised, printed or provided in another manner. The magnetic layer (2) may be located below the indicia, over the indicia, or in a full or partial layer which may or may not be in register with the indicia.

The transparent magnetic layer (2,6) is preferably vacuum metallised and then selectively demetallised in a known manner to provide the indicia, which are formed by metallised regions (3) and demetallised regions (4).

The resulting substrate can therefore have both public (overt) and machine readable (covert) features.

A further polymer layer (5) (12 μm polyester for example) may optionally be laminated to the aforementioned substrate to cover the metallised and demetallised regions (3,4) to improve its durability. The additional polymer layer (5) may or may not contain magnetic particles depending upon requirements.

The thus formed substrate may then be slit in register to form thin strips suitable for inclusion as security threads into banknotes or other security documents. Typical widths for security threads lie in the range 0.5 mm to 50 mm, and more preferably 1 mm to 10 mm. The use of the substrate of the present invention is not merely limited to use as security threads, but may also be used to provide other security media such as secure tear tapes for brand protection, or a secure substrate for the manufacture of holograms, labels, transfers, hang tags, certificates, bonds, cheques, banknotes and other documents of value. In particular the substrate is particularly suitable for manufacturing plastic banknotes. When utilised as a substrate for such applications it is envisaged that an opaque ink receptive coating be applied over at least part of the substrate.

The secure substrate described above can be further enhanced as will be understood by those skilled in the art. Such enhancements include, but are not limited to, the application of luminescent, thermochromic and, photochromic materials and embossed optically variable devices. Examples of how this might be achieved are described in EP-A-319157, GB-A-2274428, WO-A-00/54985, and WO-A-00/39391.

It would also be possible to use the invention to provide a coded security thread. Such a thread may use interspersed magnetic and text regions, or it could incorporate a coded format, such as that described in EP 407550A or a fixed length or code or use special thickness or coercivity variants to achieve a code. Fixed length coding is a spatially variant of magnetic print with a repeat length equal for, say, all denominations of a particular currency or security document set. The advantage to this type of coding is that the clocking of the code during read is easily established without the need for clocking bits in the code format. Additionally, a magnetic layer could be coated onto at least a part of the substrate to provide a magnetic code. Said additional magnetic layer could contain a magnetic material of different coercivity to that of the substrate film.

Additionally, the use of hard magnetic enables the substrate to be used not only to store predetermined information, but information can be written thereto during use using suitable equipment.

The invention will now be described in more detail by reference to the following examples.

EXAMPLE 1

In a first example, as shown in FIG. 1, the polymer carrier (1) is provided by a 12 μm standard polyester film which is coated at a coat weight of 2 gsm with a varnish (2) containing 0.1-50%, more preferably 1-30%, by weight of magnetic material. The lower range of loading can be used where more sophisticated detection equipment is available. Onto this carrier (1) a metallic reflection-enhancing layer, such as aluminium, is applied, although other metals such as copper could be used. This metallic layer is printed with a resist layer defining indicia and is then exposed to a caustic etch solution which removes the metal not protected by the resist. The caustic solution is washed away to reveal metallised regions (3) and demetallised regions (4), defining indicia. Alternatively any of the known methods for demetallisation could be used. An additional layer (5) of 12 μm polyester may then be applied using a layer of adhesive to improve durability of the substrate. The thus formed substrate may then be slit in register to form security threads for inclusion into paper or polymer as described in EP-A-59056 and GB-A-0111452.9 respectively. Where the substrate is used to form security threads a further layer of adhesive is preferably applied to one or both sides of the substrate to ensure secure location of the thread within a sheet of paper. In this, and other examples, further barrier layers are preferably provided on either side of the metallic layer to prevent environmental attack.

Figure 2:
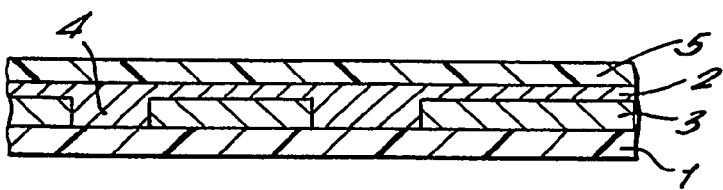
Figure 3:
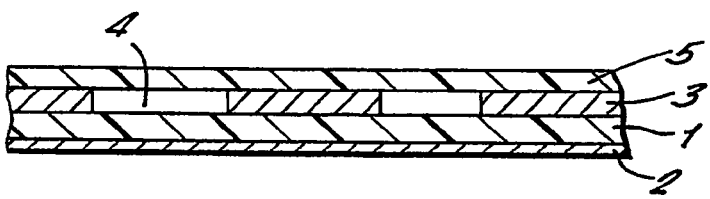

Potential alternative constructions are shown in FIGS. 2 and 3. In both these examples a metallised polymer film e.g. 12 μm metallised Type S from DuPont is demetallised as described above prior to application of the magnetic varnish layer. FIG. 2 shows the varnish layer applied onto the demetallised surface and FIG. 3 shows the varnish layer applied on the opposite side to the demetallised layer.

Alternatively, the varnish 2 may first be applied to the protective layer 5 and this construction laminated to the partially demetallised structure 3, 4.

EXAMPLE 2

Figure 5:
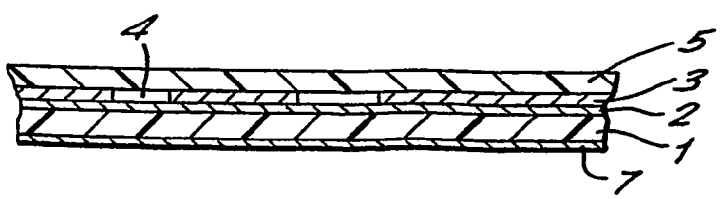
FIGS. 5, 6, and 7 are cross-sectional side elevations of further alternative embodiments of the substrate of FIG. 1 with an adhesive layer applied, for use in tear tapes.

In a second example, as shown in FIG. 5, a layer of a pressure sensitive or hot melt adhesive (7) is subsequently applied to either of the polymer layers (1,5) of the substrate of Example 1, and strips of the substrate may be used as a tear tape for secure packaging.

Figure 6:
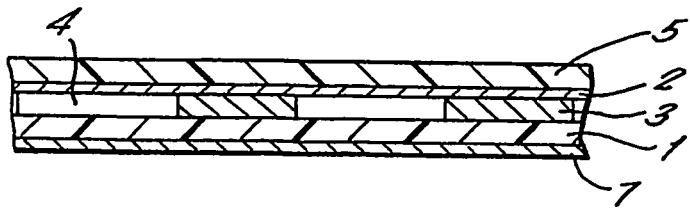
Figure 7:
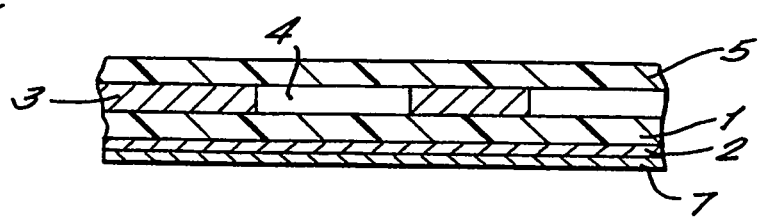

FIGS. 6 and 7 show alternative constructions with the varnish layer applied onto the demetallised layer on the opposite side of the demetallised layer.

EXAMPLE 3

Figure 8:
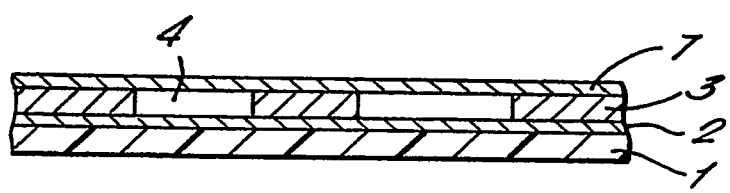
FIGS. 8 and 9 are cross-sectional side elevations of other alternative substrates to that shown in FIG. 1 with an adhesive applied to the demetallised surface, for use as a tamper evident tear tape.

As a further alternative a layer of pressure sensitive or hot melt adhesive (7) may be applied to the partially metallised surface (3,4) as shown in FIG. 8. This provides the additional benefit that tapes made from the substrate now show some tamper evident properties. When such a tape is removed from the packaging or substrate the metal region (3) will be irreversibly removed to clearly illustrate tampering. A suitable pressure sensitive adhesive would be Indatex SE 5219 (applied at between 1 gsm-20 gsm, and more preferably at 8 gsm).

Figure 9:
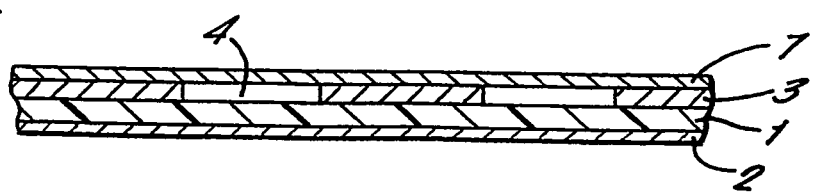

FIG. 9 shows an alternative construction with the varnish layer applied to the opposite side of the demetallised layer.

EXAMPLE 4

In this example the magnetic particles have been included as part of the polymer carrier layer (6), as shown in FIG. 4. In a typical example, 0.1-50% by weight of magnetic material would be included in the polyester, which is preferably a 12 μm film, or more preferably 1-30% by weight of magnetic material. The lower range of loading can be used where more sophisticated detection equipment is available. The polymer can then be further processed as described above.

EXAMPLE 5

Figure 10:
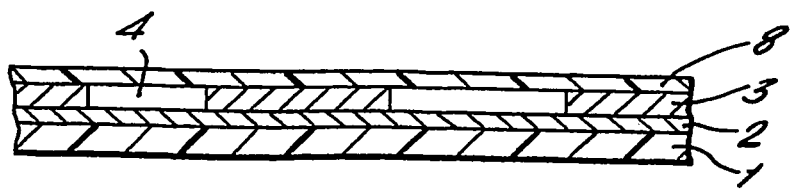
FIGS. 10, 11, and 12 are cross-sectional side elevations of further alternative substrates to that shown in FIG. 1 incorporating a high reflective index or polymer liquid crystal layer.

As an alternative a high refractive index (HRI) layer (8) such as ZnS or a polymer liquid crystal layer can be applied in addition to the partial metal layer (3, 4) as shown in FIG. 10 to provide an iridescent effect in the metallic regions (3). However, a dark or black background layer will need to be located behind any liquid crystal layer to cause the colour-shift effect.

Figure 11:
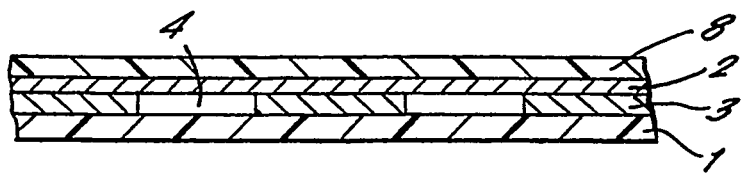
Figure 12:
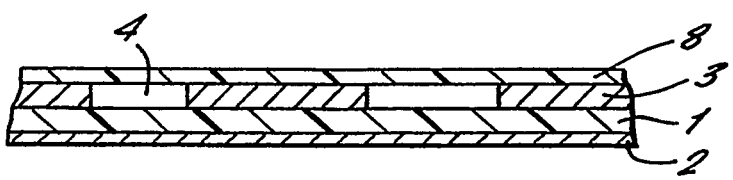

FIGS. 11 and 12 show alternative constructions where the varnish layer is applied onto the partial metal layer or onto the opposite side to the partial metal layer.

EXAMPLE 6

Figure 13:
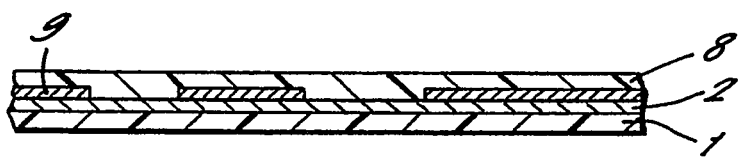
FIGS. 13, 14, and 15 are cross-sectional side elevations of further alternative substrates to that of FIG. 1, with an HRI or polymer liquid crystal layer, no metallisation and including a print feature.
Figure 14:
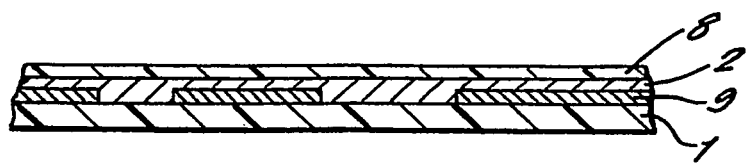
Figure 15:
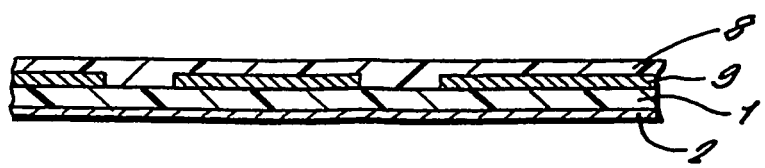
Figure 16:
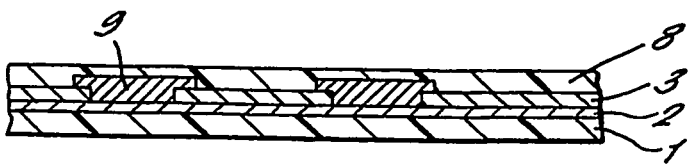
FIGS. 16, 17, 18 and 19 are cross-sectional side elevations of further alternative substrates to those shown in FIGS. 13, 14 and 15, but with the addition of a demetallised layer.
Figure 17:
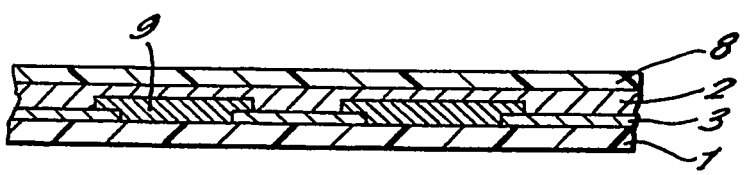
Figure 18:
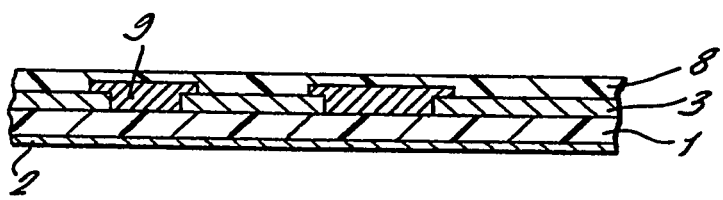
Figure 19:
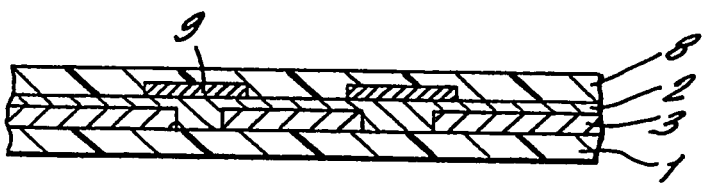
Figure 20:
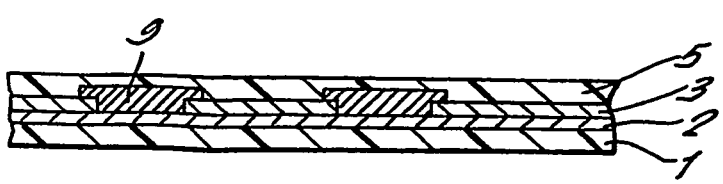
FIGS. 20, 21, 22 and 23 are cross-sectional side elevations of an alternative substrate to that shown in FIGS. 16, 17, 18 and 19 with the high refractive index or polymer liquid crystal layer replaced by a second clear polymer layer.
Figure 21:
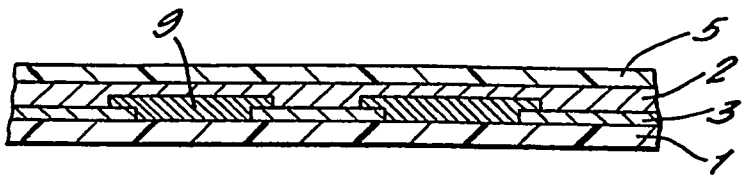
Figure 22:
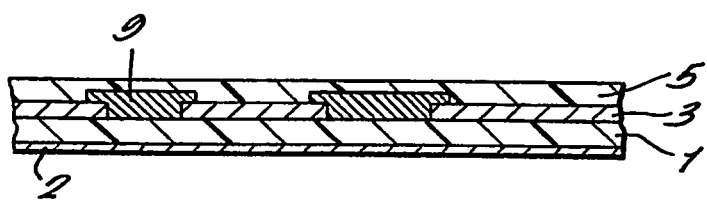
Figure 23:
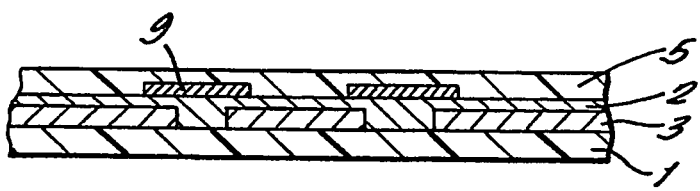
Figure 24:
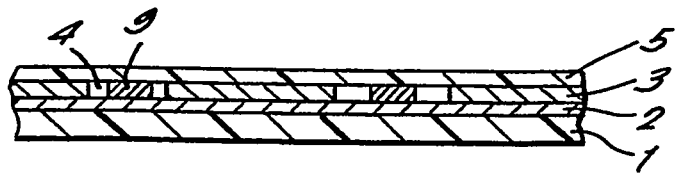
FIGS. 24, 25, 26 and 27 are cross-sectional side elevations of an alternative substrate to that shown in FIG. 20 but with the print features located within the demetallised region.
Figure 25:
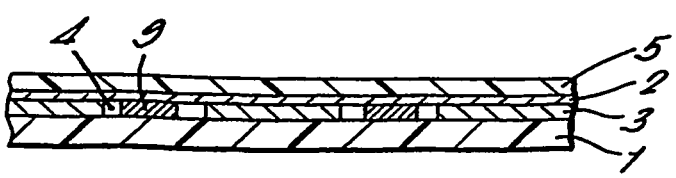
Figure 26:
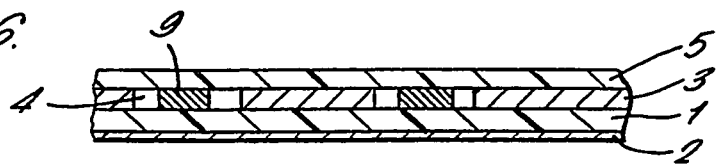
Figure 27:
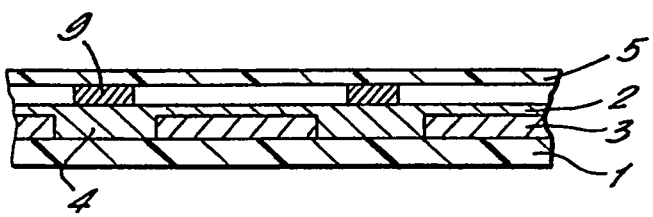
Figure 28:
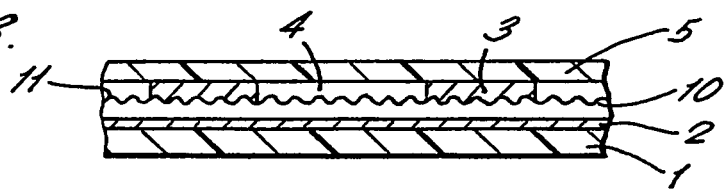
FIGS. 28 to 32 are cross-sectional side elevations of further alternative substrates incorporating optically variable devices.
Figure 29:
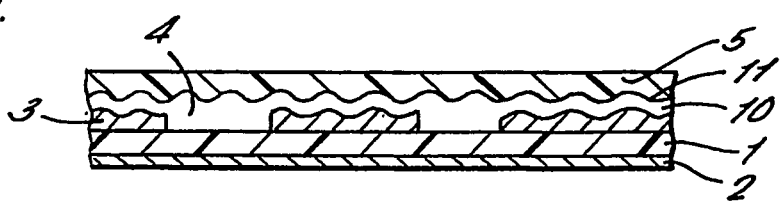
Figure 30:
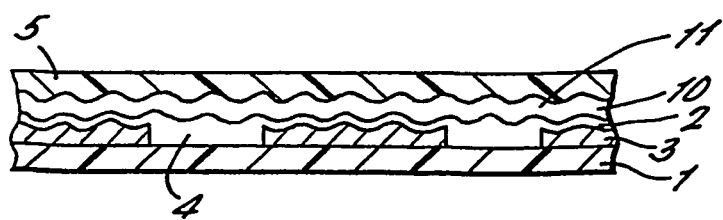
Figure 31:
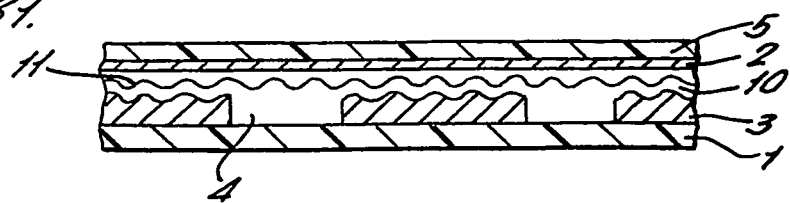

If no metal layer is present, opaque inks may be printed in selected regions (9) onto the transparent magnetic media containing layer (2,6) to form the indicia, as shown in FIGS. 13 to 15, using any of the traditional print processes such as gravure, flexo, intaglio, litho, thermal transfer, dye diffusion and so forth. Additional security can be achieved using iridescent, luminescent (visible or invisible in daylight), optically variable, liquid crystal, thermochromic or photochromic inks in conjunction with, or as an alternative to, the opaque ink. It is preferable that such inks be applied in selected regions of the substrate so as to overlie or highlight the indicia, or even provide additional indicia. Optionally an HR1 or polymer liquid crystal layer (8) may be provided.

EXAMPLE 7

The inks described above may also be applied in selected regions (9) in addition to demetallised indicia to further enhance security as shown in FIGS. 16 to 19 with the HRI or polymer liquid crystal layer (8) applied thereover, or with a second polymer layer (5) as shown in FIGS. 20 to 23.

EXAMPLE 8

In this example, as shown in FIGS. 24 to 27 the printed regions (9) are located within the demetallised regions 4, but not wholly filling them.

EXAMPLE 9

It is also possible to produce a variant of the invention incorporating an optically variable device such as a hologram, Kinegram or Exelgram. Here an additional embossing lacquer (10) is applied on to the substrate and embossed to provide an embossed surface (11). The reflection enhancing layer used to form the partially metallised layer 3, 4 may be metal, as shown in FIGS. 28 to 31.

FIGS. 28 to 31 show alternative constructions for the optically variable device utilizing a metallic reflection enhancing layer for the partially metallised layer 3, 4.

EXAMPLE 10

Figure 32:
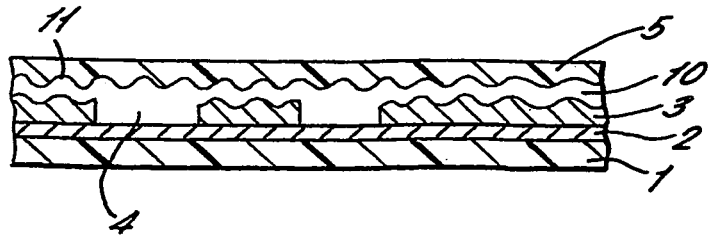

FIG. 32 illustrates an alternative construction whereby the coated film (1,2) is metallised and, selectively demetallised. An embossing lacquer (10) is applied, which is then embossed. An optional protective polymer layer(s) is applied to the embossed surface (11).

EXAMPLE 11

Figure 33:
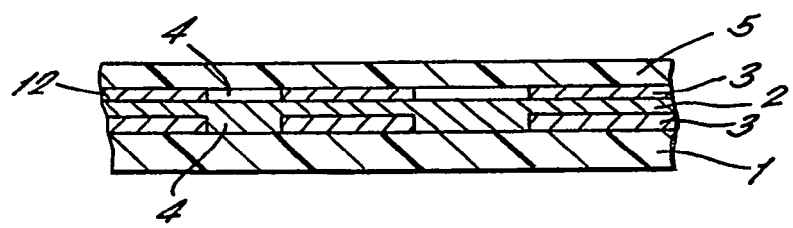
FIG. 33 is a cross-sectional side elevation of an alternative substrate to that of FIG. 2, but with two demetallised layers, one on either side of the transparent magnetic media containing layer.

In this example, as illustrated in FIG. 33, the substrate has two partially metallised layers (3,4). This is achieved by partially demetallising the first carrier layer (1) and, in a separate process, partially demetallising a second additional carrier layer (5). The magnetic material containing varnish (2) is applied to the partially metallised surface (3,4) of the first layer (1) and a laminating adhesive (12) applied to enable the second layer (5) with its demetallised surface (3,4) to be adhered to the first layer (1).

EXAMPLE 12

Figure 34:
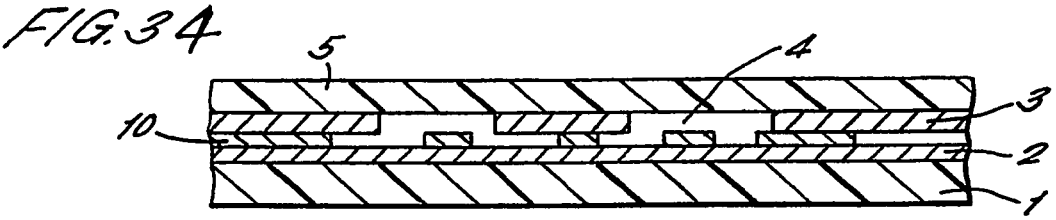
FIGS. 34 and 35 are cross-sectional side elevations of further alternative substrates which are coded.

This is an example of a coded thread as mentioned previously and as illustrated in FIG. 34. In this example an additional magnetic layer (10) is applied to the transparent magnetic media containing layer (2). The additional magnetic layer (10) is preferably discontinuous and also transparent, but incorporates a material of differing coercivity to that of layer (2). Although it is preferred that the layer (10) is transparent, a non-transparent magnetic material may be used in layer 10. The additional layer (10) may also comprise several different magnetic materials printed sequentially to define a code, either abutting or overlapping to form a continuous layer.

EXAMPLE 13

Figure 35:
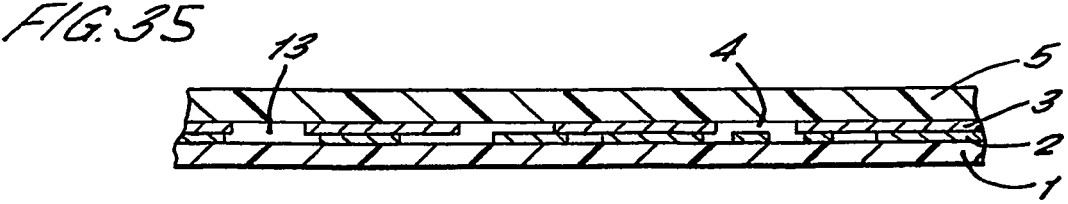

This is a further example of a coded substrate, as illustrated in FIG. 35, in which the magnetic material containing varnish (2) is applied in a discontinuous manner to define a code. The code may be printed with several materials having different coercivities. In this example, the need for an additional magnetic layer is described in Example 12 is removed. However, as with the previous examples, where using materials of differing coercivities, these can be printed in sequence either abutting or overlapping to form a continuous layer. In this Example numeral (13) denotes an uncoated magnetic region. In an alternative embodiment, the code does not need to be in register with the indicia.

In all the aforementioned examples it should be noted that, as mentioned in conjunction with Example 12, the demetallised construction consisting of the carrier layer (1) and partially metallised surface (3,4) can be formed separately from the transparent magnetic construction comprising the protective layer (5) with the magnetic material containing varnish (2) and then laminated together using a suitable adhesive.

The invention claimed is:

1. A security substrate comprising a transparent polymer carrier layer, an indicia layer supported by the carrier layer, said indicia layer comprising a plurality of opaque and non opaque regions which define indicia, and a transparent magnetic layer supported by the carrier layer, said magnetic layer comprising a distribution of particles of a hard magnetic material having a magnetic remanance in the absence of an applied magnetic field, said particles being of a size and distributed in a concentration at which the magnetic layer remains transparent, wherein the magnetic layer contains between 0.1 and 50% by weight of magnetic material, and wherein the magnetic layer covers at least some of the non-opaque regions of said indicia layer, and wherein said transparent magnetic layer is out of register with said opaque and non-opaque regions of said indicia layer such that said non-opaque regions of said indicia layer are only partially in register with said transparent magnetic layer.

2. The security substrate as claimed in claim 1, wherein said transparent magnetic layer partially covers said non-opaque regions of said indicia layer.

3. The security substrate as claimed in claim 1, wherein said transparent magnetic layer is partially under said non-opaque regions of said indicia layer.

\* \* \* \* \*